United States Patent
Yun

(10) Patent No.: US 9,524,119 B2
(45) Date of Patent: Dec. 20, 2016

(54) METHOD, SYSTEM AND RECORDING MEDIUM FOR OPTIMIZING OF MOBILE DEVICE

(71) Applicant: NAVER CORPORATION, Seongnam-si, Gyeonggi-do (KR)

(72) Inventor: Chan Ho Yun, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/755,314

(22) Filed: Jun. 30, 2015

(65) Prior Publication Data
US 2016/0004472 A1 Jan. 7, 2016

(30) Foreign Application Priority Data

Jul. 1, 2014 (KR) .................. 10-2014-0081977
Jan. 16, 2015 (KR) .................. 10-2015-0007944

(51) Int. Cl.
| | | |
|---|---|---|
| G06F 3/00 | (2006.01) | |
| G06F 12/00 | (2006.01) | |
| G06F 3/06 | (2006.01) | |
| G06F 9/54 | (2006.01) | |
| G06F 17/30 | (2006.01) | |
| G06F 9/48 | (2006.01) | |
| G06F 9/50 | (2006.01) | |

(52) U.S. Cl.
CPC ........... *G06F 3/0629* (2013.01); *G06F 3/0604* (2013.01); *G06F 3/0673* (2013.01); *G06F 9/485* (2013.01); *G06F 9/5022* (2013.01); *G06F 9/54* (2013.01); *G06F 17/30091* (2013.01)

(58) Field of Classification Search
CPC .............................. G06F 9/54; G06F 17/30091
USPC ........................................... 719/310; 707/821
See application file for complete search history.

(56) References Cited

U.S. PATENT DOCUMENTS

2004/0257931 A1* 12/2004 Kudou .................. G11B 20/10
369/47.1
2009/0138847 A1* 5/2009 Beckwith ................ G06F 9/443
717/108

(Continued)

FOREIGN PATENT DOCUMENTS

KR 100643460 B1 10/2006
KR 2013-0004862 A 1/2013

OTHER PUBLICATIONS

Thomas Kistler, Continuous Program Optimization: A Case Study, 2003.*

(Continued)

*Primary Examiner* — Lechi Truong
(74) *Attorney, Agent, or Firm* — Harness, Dickey & Pierce, PLC

(57) ABSTRACT

Provided are a method, system, and non-transitory computer-readable medium for optimizing a mobile device by analyzing an execution pattern or a storage pattern of an application. An optimization method configured as a computer including a processor may include identifying, by the processor, an arrangement target for optimization by analyzing an execution pattern or a storage pattern of each of applications installed in a mobile device; and optimizing, by the processor, a storage space embedded in the mobile device based on the arrangement target.

15 Claims, 11 Drawing Sheets

(56) References Cited

U.S. PATENT DOCUMENTS

| | | | |
|---|---|---|---|
| 2012/0297151 A1* | 11/2012 | Kaminaga | G06F 12/023 |
| | | | 711/154 |
| 2013/0060959 A1* | 3/2013 | Taveau | H04W 12/08 |
| | | | 709/232 |
| 2014/0067879 A1* | 3/2014 | Ahn | G06F 17/30312 |
| | | | 707/812 |

OTHER PUBLICATIONS

Korean Office Action dated Dec. 8, 2015 issued in corresponding Korean Application No. 10-2015-0007944.
"Optimized application for cleaning up your smart phone—manual for Clean Master." gdora (manager of blog). Mar. 4, 2014. http://blog.naver.com/gdora/150186281280 (with English abstract).

* cited by examiner

METHOD, SYSTEM AND RECORDING MEDIUM FOR OPTIMIZING OF MOBILE DEVICE

CROSS-REFERENCE TO RELATED APPLICATION

This application claims priority from and the benefit of Korean Patent Application No. 10-2014-0081977, filed on Jul. 1, 2014, and Korean Patent Application No. 10-2015-0007944, filed on Jan. 16, 2015, the disclosure of which is incorporated herein its entirety by reference.

BACKGROUND

Field

Example embodiments relate to technology for improving, enhancing, or optimizing the performance of a mobile device.

Description of the Background

Users using mobile devices experience inconvenience associated with speed, battery, and/or storage space, such as latency, insufficient battery amount, degradation in battery performance, and/or lack of storage space.

To facilitate management on the user side, recent mobile devices provide a function of displaying a battery temperature, a remaining battery amount, and a remaining battery time, a function of deleting cache or remaining files, and unnecessary applications, and the like.

However, due to a complex use method or menu configuration of an application, a user needs to find a necessary function in person based on an application. As described above, such a difficulty makes the user experience in managing a mobile device inconvenient.

SUMMARY

Some example embodiments provide a method, system, and/or non-transitory computer-readable medium that may improve, enhance, or optimize a mobile device by classifying applications.

Some example embodiments provide a method, system, and/or non-transitory computer-readable medium that may improve, enhance, or optimize a mobile device based on the result of a storage pattern analysis of an application.

Some example embodiments provide a method, system, and/or non-transitory computer-readable medium that may improve, enhance, or optimize a mobile device based on an execution history or a file size of an application.

Some example embodiments provide a method, system, and/or non-transitory computer-readable medium that may classify an arrangement target for improving, enhancing, or optimization of each application or file format and may inform a user of a mobile device about the arrangement target.

According to at least one example embodiment, there is provided an improvement, enhancement, or optimization method configured as a computer including a processor, the method including identifying, by the processor, an arrangement target for improvement, enhancement, or optimization by analyzing an execution pattern or a storage pattern of each of applications installed in a mobile device, and improving enhancing, or optimizing, by the processor, a storage space embedded in the mobile device based on the arrangement target.

The identifying may include classifying the applications into a first application executed by a user based on the execution pattern and a second application executed by a system without being executed by the user and then identifying the second application as the arrangement target.

The improving or optimizing may include improving, enhancing, or optimizing the storage space by terminating or deleting the second application.

The identifying may include additionally identifying, as the arrangement target, at least one of an application having no execution history during at least a desired period, a file having at least a desired size, content having no use history during at least a desired period, and content having at least a desired storage period.

The identifying may include excluding an application registered to a white list among the applications from the arrangement target.

The identifying may include identifying, as the arrangement target, a folder and a file stored in the storage space during installing and using each application by analyzing a pattern of each application that is stored in the storage space.

The improving, enhancing, or optimizing may include improving, enhancing, or optimizing the storage space by deleting the folder and the file identified as the arrangement target with respect to an application, in response to deleting the application.

The improving, enhancing, or optimizing may include classifying files identified as the arrangement target for each format and thereby providing the classified files to a user, and deleting all of or a portion of the files in response to a selection of the user.

The improving, enhancing, or optimizing may include additionally improving, enhancing, or optimizing the storage space during loading a desired application in response to a request for executing the desired application among the applications.

The improving, enhancing, or optimizing may include additionally improving, enhancing, or optimizing the storage space in a sleep mode in response to the mobile device being switched to the sleep mode.

According to at least one example embodiment, there is provided a non-transitory computer-readable medium including computer-readable instructions, wherein when executed by a processor, the computer-readable instructions are configured to control a computer system by a method including identifying an arrangement target for improvement, enhancement, or optimization by analyzing an execution pattern or a storage pattern of each of applications installed in a mobile device, and improving, enhancing, or optimizing a storage space embedded in the mobile device based on the arrangement target.

According to at least one example embodiment, there is provided an improvement, or optimization system including a processor, and a memory, wherein the processor includes a classifier configured to identify an arrangement target for improvement, or optimization by analyzing an execution pattern or a storage pattern of each of applications installed in a mobile device, and an improver, enhancer, or optimizer configured to improve, enhance, or optimize a storage space embedded in the mobile device based on the arrangement target.

The classifier may be configured to classify the applications into a first application executed by a user based on the execution pattern and a second application executed by a system without being executed by the user and then to identify the second application as the arrangement target.

The classifier may be configured to additionally identify, as the arrangement target, at least one of an application having no execution history during at least a desired period, a file having at least a desired size, content having no use history during at least a desired period, and content having at least a desired storage period.

The classifier may be configured to exclude an application registered to a white list among the applications from the arrangement target.

The classifier may be configured to identify, as the arrangement target, a folder and a file stored in the storage space during installing and using each application by analyzing a pattern of each application that is stored in the storage space.

The improver, enhancer, or optimizer may be configured to improve, enhancer, or optimize the storage space by deleting the folder and the file identified as the arrangement target with respect to an application in response to deleting the application.

The improver, enhancing, or optimizer may be configured to classify the files identified as the arrangement target for each format and thereby provide the classified files to a user, and to delete all of or a portion of the files in response to a selection of the user.

The improver, enhancing, or optimizer may be configured to additionally improve, enhance, or optimize the storage space during loading a desired application in response to a request for executing the desired application among the applications.

The improver, enhancer, or optimizer may be configured to additionally improve, enhance, or optimize the storage space in a sleep mode in response to the mobile device being switched to the sleep mode.

It is to be understood that both the foregoing general description and the following detailed description are explanatory and are intended to provide further explanation of the example embodiments as claimed.

According to at least one example embodiment, it is possible to improve, enhance, or optimize a mobile device by classifying applications based on an execution pattern, and to improve, enhance, or optimize a state of the mobile device by occluding unnecessary applications aside from applications being actually used by a user.

Also, according to at least one example embodiment, it is possible to improve, enhance, or optimize a mobile device by analyzing a storage pattern of an application, and to remove all of constituent elements associated with the application. Accordingly, it is possible to fully recover an entire memory space.

Also, according to at least one example embodiment, since an arrangement target for improvement, enhancement, or optimization is classified for each format and informed to a user, the user may easily verify the arrangement target and thus, may reduce or prevent a file damage from occurring due to a unilateral deletion.

BRIEF DESCRIPTION OF THE DRAWINGS

The foregoing and other features of the example embodiments will be apparent from the more particular description of non-limiting embodiments, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
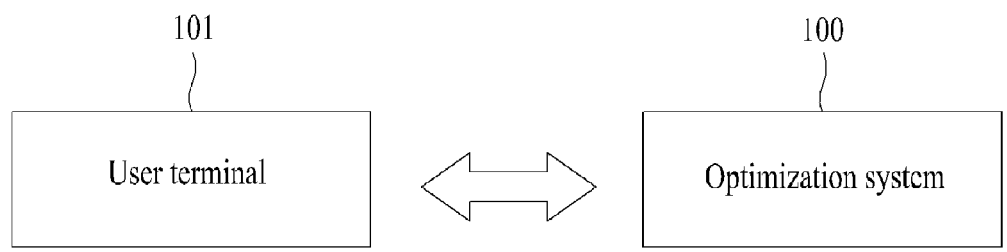
FIG. 1 is a diagram illustrating a relationship between a user terminal and an improvement, enhancement, or optimization system according to at least one example embodiment.

Example embodiments will now be described more fully with reference to the accompanying drawings, in which some example embodiments are shown. Example embodiments, may, however, be embodied in many different forms and should not be construed as being limited to the example embodiments set forth herein; rather, these example embodiments are provided so that this disclosure will be thorough and complete, and will fully convey the scope of the example embodiments to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. It is noted that the term "optimizer" and all variants thereof used in the description of example embodiments, figures and claims is not necessarily limited to absolute optimization, but may also include incremental improvements or enhancements, as is evident from the present specification.

Hereinafter, example embodiments will be described with reference to accompanying drawings.

At least one example embodiment relates to technology for improving, enhancing, or optimizing the performance of a mobile device, and more particularly, to a method, system, and non-transitory computer-readable medium that may improve, enhance, or optimize a mobile device by analyzing an execution pattern or a storage pattern of an application.

FIG. 1 is a diagram illustrating a relationship between a user terminal and an improvement, enhancement, or optimization system according to some example embodiments. FIG. 1 illustrates an improvement, enhancement, or optimization system 100 and a user terminal 101. In FIG. 1, an arrow indicator may indicate that data may be transmitted and received over a wireless network or a data bus between the improvement, enhancement, or optimization system 100 and the user terminal 101.

The user terminal 101 may indicate any type of terminal devices, such as a smartphone, a tablet, and a mobile device such as a wearable device, capable of installing and executing an exclusive application (hereinafter, an 'optimization App') associated with the improvement, enhancement, or optimization system 100. Here, the user terminal 101 may perform the overall service configuration, such as a service screen configuration, a data input, a data transmission and reception, a data storage, or the like, under the control of the optimization App.

The improvement, enhancement, or optimization system 100 may serve to provide an improvement, enhancement, or optimization function of managing a storage space of the user terminal 101 to maintain the performance of the user terminal 101 in a desired or optimal state. In particular, the improvement, enhancement, or optimization system 100 may classify applications within the user terminal 101 by analyzing an execution pattern or a storage pattern of an application, and may improve, enhance, or optimize the user terminal 101 based on the classification. The storage space of the user terminal 101 may be used as a storage that functions to store a program code required for a basic system operation, such as an operating system (OS), in an embedded memory form, and to store photos, videos, music, audios, documents, and various types of contents. The performance of the user terminal 101 is degraded according to an increase in a memory capacity. Thus, a memory space needs to be appropriately emptied to maintain the performance of the user terminal 101 in an optimal state. Here, the improvement, enhancement, or optimization system 100 may be configured in an application form on the user terminal 101. Further, without being limited thereto, the improvement, enhancement, or optimization system 100 may be configured to be included in a service platform that provides an optimization service in a client-server environment.

Figure 2:
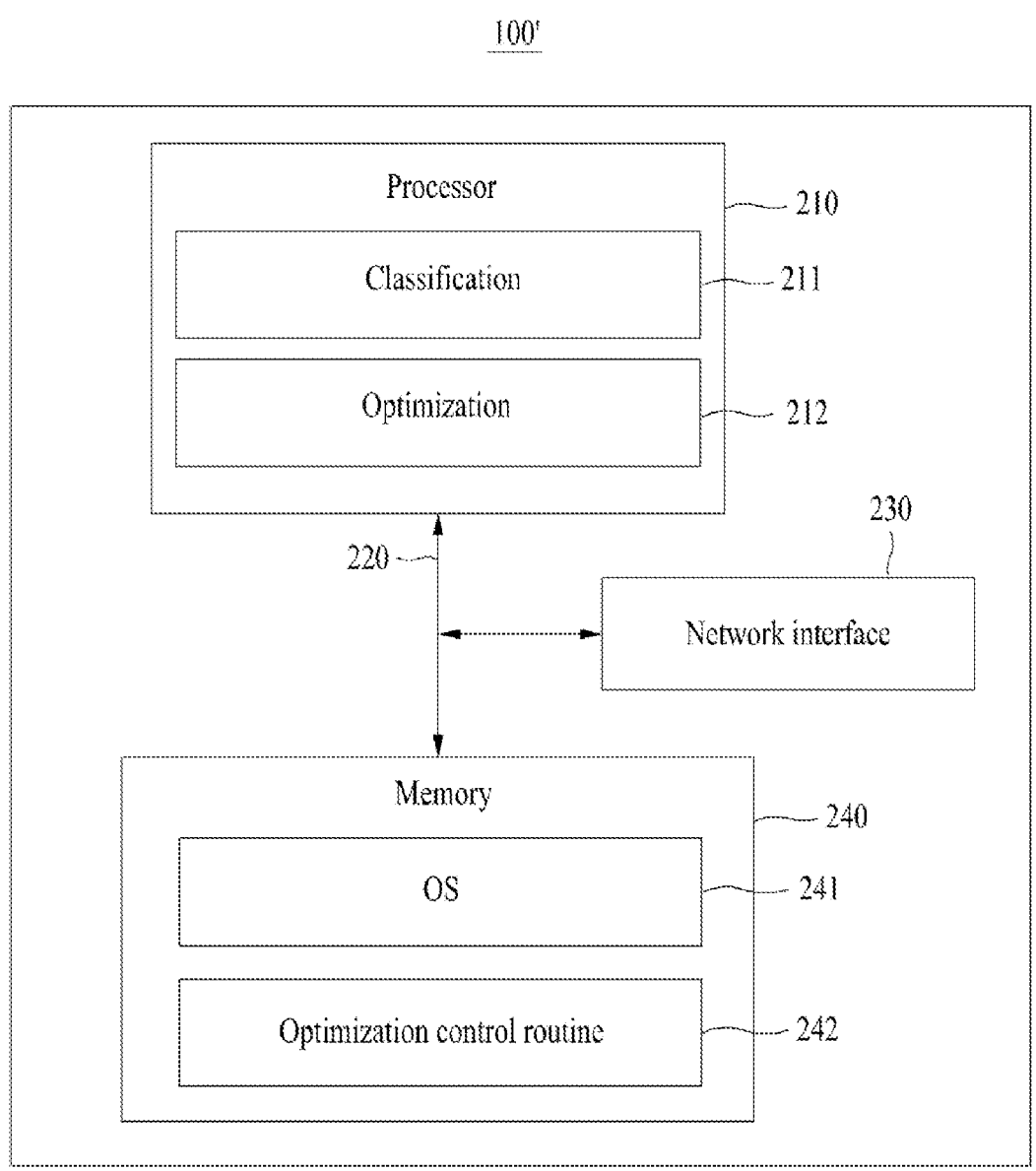
FIG. 2 is a block diagram illustrating a configuration of an improvement, enhancement, or optimization system according to at least one example embodiment.

FIG. 2 is a block diagram illustrating a configuration of an improvement, enhancement, or optimization system according to some example embodiments.

Referring to FIG. 2, the optimization system 100' may include a processor 210, a bus 220, a network interface 230, and/or a memory 240. The memory 240 may include an OS 241 and an optimization control routine 242. The processor 210 may include a classifier 211 and an optimizer 212. According to other example embodiments, the optimization system 100' may include a more number of constituent elements than the number of constituent elements of FIG. 2. Alternatively, a portion of the constituent elements may be omitted.

The memory 240 may include a permanent mass storage device, such as a random access memory (RAM), a real only memory (ROM), and a disc drive, as a computer-readable storage medium. Also, program codes for the OS 241 and the optimization control routine 242, and the like, may be stored in the memory 240. Such software constituent elements may be loaded from another computer-readable storage medium separate from the memory 240 using a drive mechanism (not shown). The other computer-readable storage medium may include, for example, a floppy drive, a disc, a tape, a DVD/CD-ROM drive, and a memory card. Software constituent elements may be loaded to the memory 240 through the network interface 230 instead of using the computer-readable storage medium.

The bus 220 enables communication and data transmission between the constituent elements of the optimization system 100'. The bus 220 may be configured using a high-speed serial bus, a parallel bus, a storage area network (SAN), and/or another appropriate communication technology.

The network interface 230 may be a computer hardware constituent element for connecting the optimization system 100' to the computer network. The network interface 230 may connect the optimization system 100' to the computer network through a wireless or wired connection.

The processor 210 may be configured to process computer-readable instructions of a computer program by performing a basic calculation, a logic, and/or an input/output operation of the optimization system 100'. The computer-readable instructions may be provided from the memory 240 or the network interface 230 to the processor 210 through the bus 220. The processor 210 may be configured to execute program codes for the classifier 211 and the optimizer 212. The program codes may be stored in a storage device such as the memory 240.

When executed by a processor, such as the processor 210, the computer-readable instructions associated with the classifier 211 and the optimizer 212 may specially configure the processor to perform an optimization method to be described below.

Figure 3:
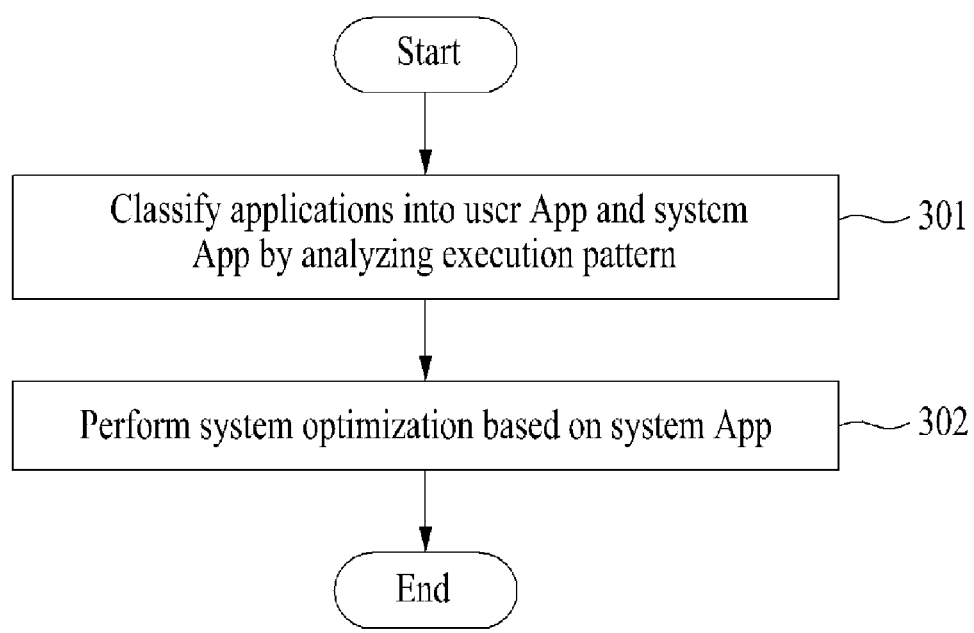
FIG. 3 is a flowchart illustrating an example of an improvement, enhancement, or optimization method of a mobile device according to at least one example embodiment.

FIG. 3 is a flowchart illustrating an example of an optimization method of a mobile device according to some example embodiments. Operations included in the optimization method of FIG. 3 may be performed by the classifier 211 and the optimizer 212 that are included in the optimization system 100' of FIG. 2.

An application of a mobile device may be identified as an application (hereinafter, a 'user App') executed in response to a direct request of a user or an application (hereinafter, a 'system App') automatically executed by a system without being executed by the user. As a matter of fact, applications occupying a memory of the mobile device may be classified into a user App and a system App. Many existing optimization methods may initially terminate all of the applications instead of classifying the applications into a user App and a system App. Although the user App and the system App are terminated at a time, an application that is to receive a notification or an important application or service in view of a system, among the terminated Apps, may be executed again in a desired (or alternatively predetermined) period of time, for example, a few minutes. When an application or a service important for the system is terminated during an optimization process, the system may become unstable.

To overcome the aforementioned issues, some example embodiments propose an optimization technology capable of optimizing a mobile device by distinguishing a user App from a system App.

In operation 301, the classifier 211 may classify applications executed on a mobile device into a user App and a system App by analyzing an execution pattern of each application. For example, the classifier 211 may identify, as an arrangement target for optimization, a system App automatically executed by a system without being directly executed by a user, based on whether the user directly executes the application. In addition, the classifier 211 may identify, as an arrangement target for optimization, an application not executed on the mobile device by the user during at least a desired (or alternatively predetermined) period, for example, 30 or more days or a file of at least a desired (or alternatively predetermined) size, for example, 10 Mb or more. Also, the classifier 211 may identify, as an arrangement target for optimization, a temporary file such as a cache file, content, for example, a photo, a video, music, an audio, and a document, unused during at least a desired (or alternatively predetermined) period, old content stored during at least a desired (or alternatively predetermined) period, or the like.

In operation 302, the optimizer 212 may perform system optimization on the arrangement target identified in operation 301. For example, the optimizer 212 may optimize the storage space of the mobile device by terminating or deleting a system App that is not directly executed by the user and is automatically executed by the system. That is, the optimizer 212 may identify, as an arrangement target, an unnecessary application or service, for example, a basic application installed by a communication company or a manufacturer of the mobile device, aside from an application being actually used by the user and may perform system optimization. Further, to solve an issue that an optimal state of the mobile device is not maintained long due to Apps automatically re-executed even after the forced termination, and to provide a fundamentally convenient environment to the mobile device, the optimizer 212 may optimize the storage space of the mobile device by deleting the arrangement target that unnecessarily occupies the storage space of the mobile device. For example, the arrangement target may be an application not executed during at least a desired (or alternatively predetermined) period, a file of at least a desired (or alternatively predetermined) size, and the like. In this example, a portion of applications on the mobile device may be processed using a white list through a presetting by the user. A system App included in the white list may be protected without being terminated or deleted during an optimization process, although the system App is selected as the arrangement target for optimization.

According to some example embodiments, optimization may be performed based on a system App by distinguishing a user App executed by a user from the system App automatically executed by a system.

Figure 4:
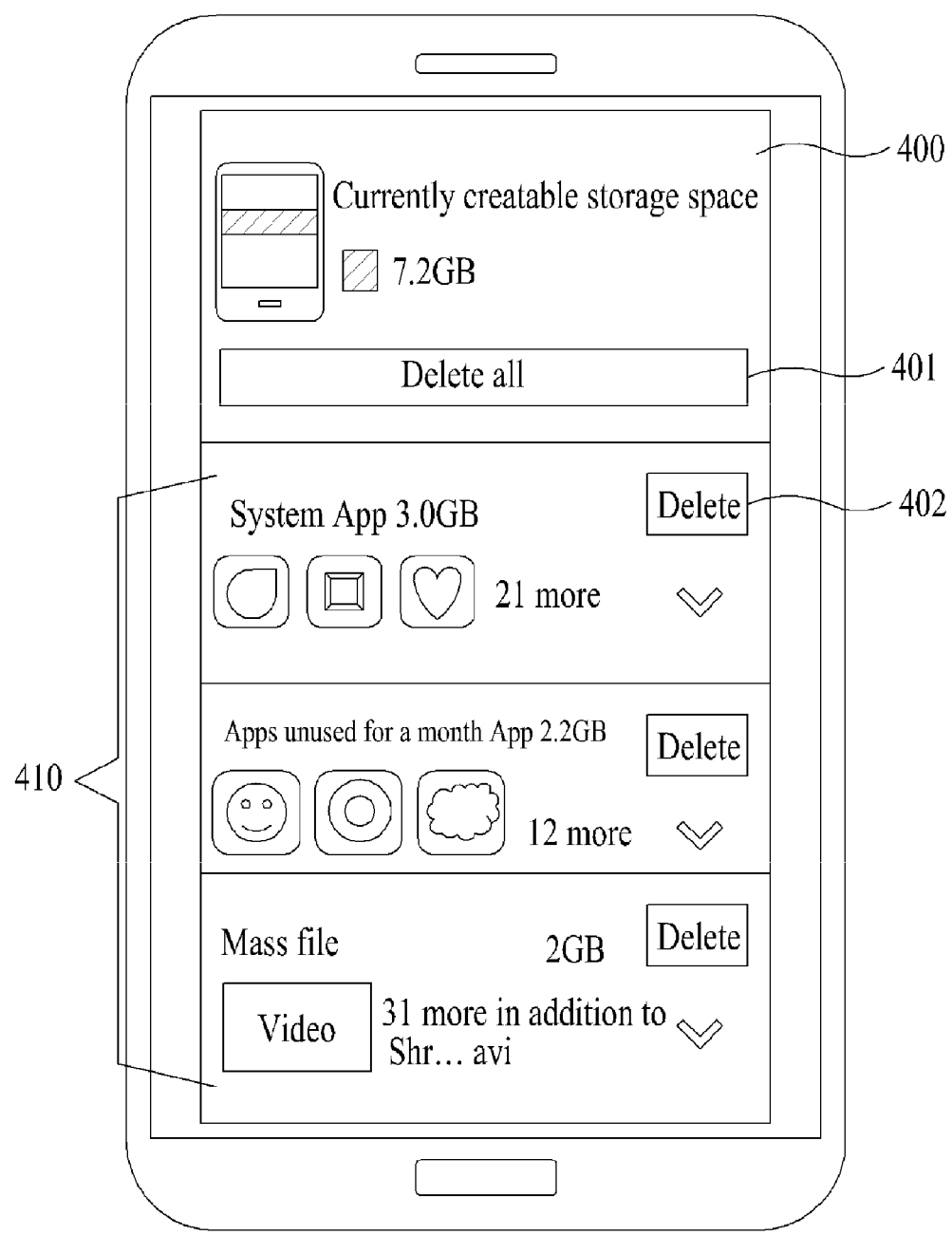
FIGS. 4 and 5 illustrate an example of a system improvement, enhancement, or optimization scenario according to at least one example embodiment.
Figure 5:
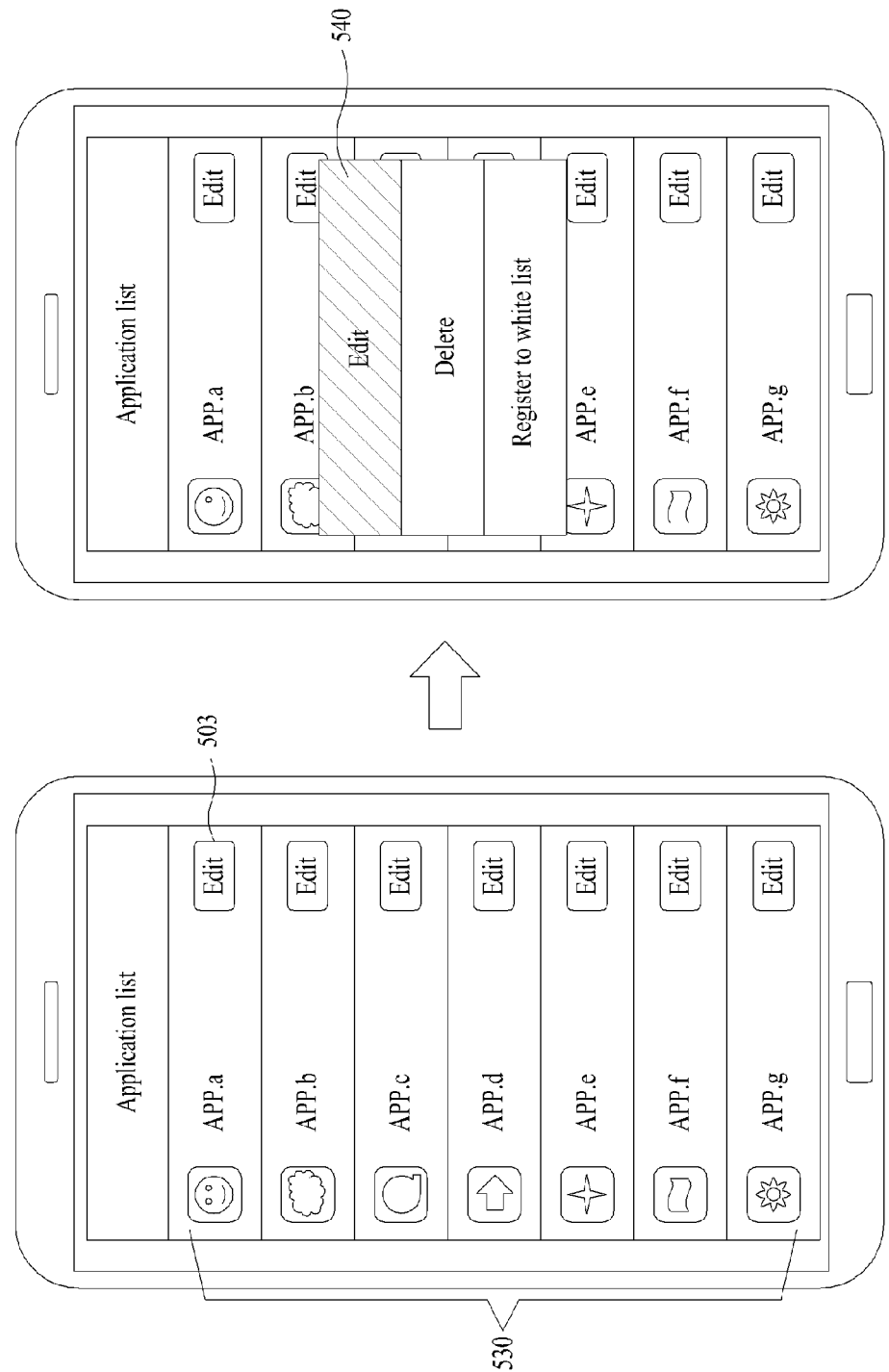

FIGS. 4 and 5 illustrate an example of a system optimization scenario according to some example embodiments.

FIG. 4 illustrates an optimization service screen 400 for optimizing a mobile device. Referring to FIG. 4, an optimization App may provide the optimization service screen 400 in response to an optimization request input from a user or when optimization is required based on a system circumstance. Here, a function of deleting an arrangement target for optimization of a mobile device, for example, an App unused during a desired (or alternatively predetermined) period, a mass file unnecessarily occupying a memory, or the like may be displayed on the optimization service screen 400. For example, the optimization service screen 400 may include a 'delete all' function 401 capable of deleting all of targets to be arranged at a time and a function 402 of providing a list 410 in which targets to be arranged are classified for each item and deleting targets corresponding to an item selected by the user from the list 410. The list 410 may include a function of verifying targets to be arranged, included in each item, for each item and a function of deleting the verified targets. In this example, a specific item may include a function of collectively deleting or individually selecting and deleting targets to be arranged, included in an item. The user may verify in detail, for example, an App corresponding to a system App, an App unused during a desired (or alternatively predetermined) period, and a mass file unnecessarily occupying a memory, through the optimization service screen 400. The user may delete all of the files to be arranged or may selectively delete one or more files to be arranged, which are included in one or more items. The optimization App may perform system optimization by deleting an arrangement target in response to a user agreement or a user selection.

FIG. 5 illustrates an application list 530 installed in a mobile device. In this example, the application list 530 may include all of system environments that enlist one or more applications. Referring to FIG. 5, the application list 530 may include an 'edit' function 503 capable of editing an application for each application included in a list. In response to selecting the 'edit' function 503, an edition screen 540 for editing the application may be displayed. For example, the edition screen 540 may include a 'delete' function of deleting an application and a 'white list' function of registering an application to a white list to be excluded from an arrangement target for optimization. If necessary, the user may select a desired (or alternatively predetermined) application from the application list 530, may register the selected application to a white list through the edition screen 540 and accordingly, may protect the application from being deleted during an optimization process.

Figure 6:
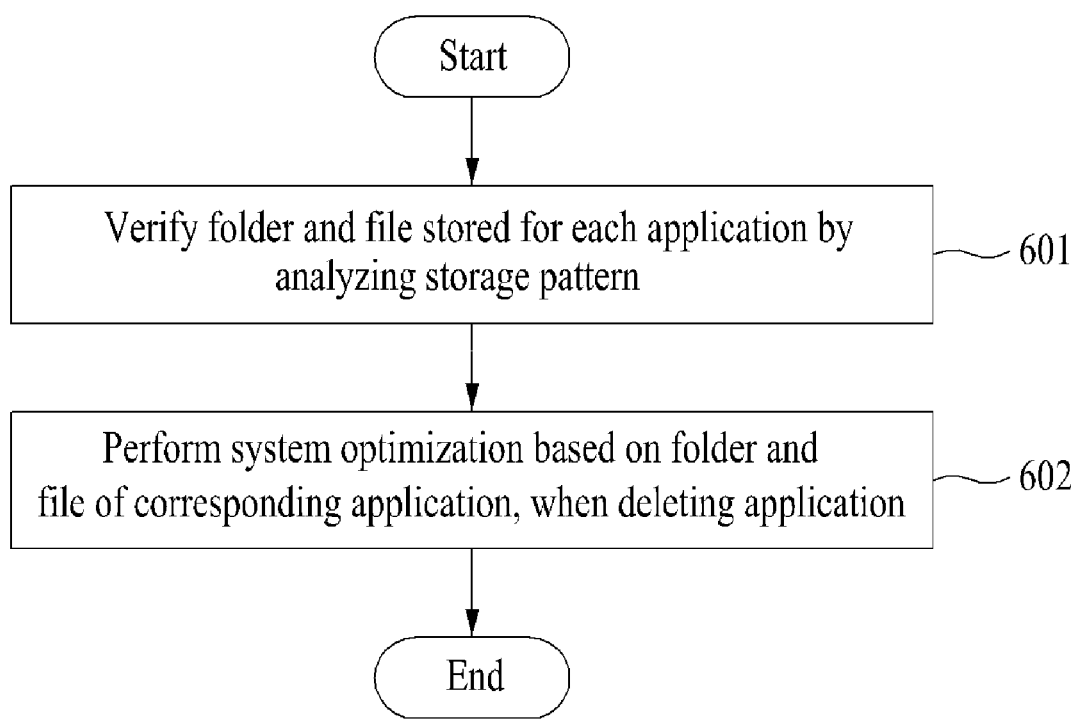
FIG. 6 is a flowchart illustrating another example of an improvement, enhancement, or optimization method of a mobile device according to at least one example embodiment.

FIG. 6 is a flowchart illustrating another example of an optimization method of a mobile device according to some example embodiments. Operations included in the optimization method of FIG. 6 may be performed by the classifier 211 and the optimizer 212 that are included in the optimization system 100' of FIG. 2.

In operation 601, the classifier 211 may verify a folder configured during installing an application, a folder configured during using the application, and a downloaded file by analyzing a storage pattern of a folder associated with the application. For each type of application, a folder configuration has a common storage pattern when an application is to be installed. For example, in the case of a game application or a general application, an application is installed in such a manner that an installation folder is configured and configuration elements of the application are stored in the installation folder. In the case of a specific application, when a file download is to be performed during using the specific application, a separate folder may be created to download a file. As described above, the classifier 211 may analyze a storage pattern for each application and may generate, as a database, information, for example, a folder name, a file name, and a storage location, about a folder configured during installing an application, a folder configured during using the application, and a downloaded file.

In operation 602, the optimizer 212 may perform system optimization based on a folder and a file associated with an application, when deleting the application. That is, the optimizer 212 may optimize a storage space occupied by the application by deleting all of the folders and files of the application stored in a storage space of a mobile device, based on a storage pattern of the application.

In the related art, when deleting an application, only an installation folder created during installing the application may be deleted and a folder created during executing the application may be stored in a separate storage space different from the installation folder and thus, may remain and unnecessarily occupy the storage device of the mobile device without being deleted. However, according to some example embodiments, a database may be generated by analyzing a storage pattern of an application and thus, an entire memory space occupied by the application may be fully recovered by deleting all of folders created during installing and using the application when deleting the application.

When deleting an application, the optimizer 212 may provide a function that enables the user to selectively delete or use a file with respect to files included in a folder to be deleted. Regardless of deleting the application, a portion of files downloaded by the application may be valuable information to the user and thus, deleting of a file may be determined by the user. For example, the optimizer 212 may classify files included in a folder to be deleted for each format, for example, a video, a photo, music, a document, and others, and thereby provide the classified files to the user. Further, the optimizer 212 may provide the user with information about an application used to download each file. Accordingly, the user may verify files to be deleted together with the application for each format, and if necessary, may delete all of or a portion of the files or may exclude the files from a target to be deleted and remain the files in a storage space.

According to some example embodiments, it is possible to perform optimization by analyzing a common pattern of stored folders for each application and by identifying a type of an installed App.

Further, when executing a desired (or alternatively predetermined) App, the optimizer 212 may automatically perform optimization prior to executing the App. In this example, the optimization may secure a memory space by terminating another App in execution or by deleting a temporary file such as a cache file, an App unused during a desired (or alternatively predetermined) period, a file with at least a desired (or alternatively predetermined) size, and the like. For example, the optimizer 212 may automatically perform system optimization during loading a specific App, in response to a request for executing the specific App such as a game App, a messenger App, and a social network service (SNS) App. In this example, the App may be determined using applications corresponding to a specific type within an optimization App. The optimizer 212 may automatically perform an optimization task by scanning Apps of the specific type among Apps installed in the mobile device and by maintaining a list of the scanned Apps when installing an optimization App. In addition, the user may set the specific App and the optimization task may be automatically performed when executing the specific App set by the user.

Further, the optimizer 212 may automatically perform optimization in a sleep mode in which a screen of the mobile device is turned OFF. Likewise, the optimization may secure a memory space by terminating another App in execution or by deleting a temporary file such as a cache file, an App unused during a desired (or alternatively predetermined) period, a file of at least a desired (or alternatively predetermined) size, and the like. For example, when the mobile device is switched to a sleep mode and a desired (or alternatively predetermined) time, for example, five seconds is elapsed, the optimizer 212 may automatically perform system optimization. When the mobile device is switched from the sleep mode to a wakeup mode in response to completing the system optimization, the optimizer 212 may provide a notification about optimization on at least one of a taskbar and a wallpaper of the mobile device.

Figure 7:
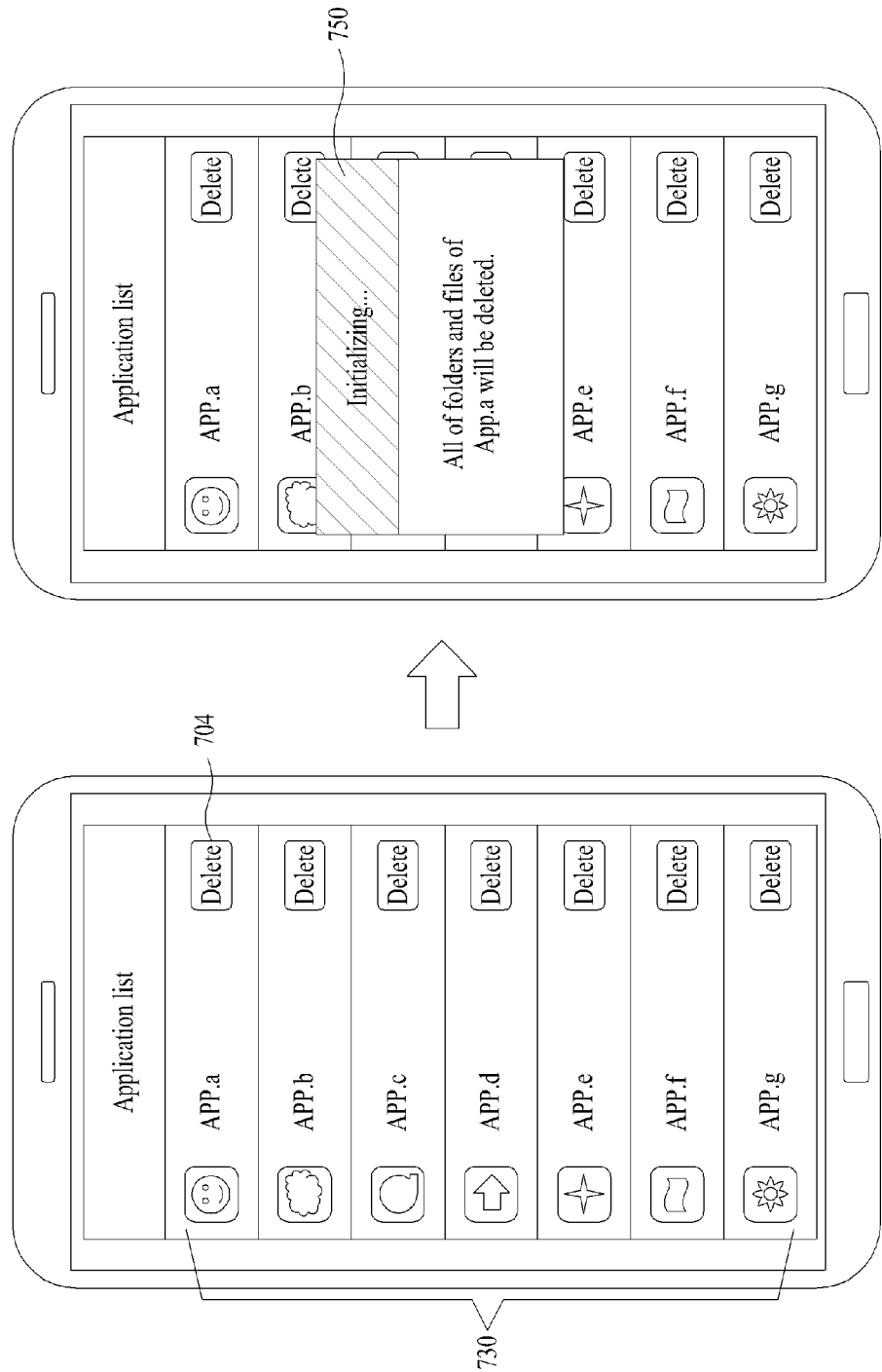
FIGS. 7 and 8 illustrate another example of a system improvement, enhancement, or optimization scenario according to at least one example embodiment.
Figure 8:
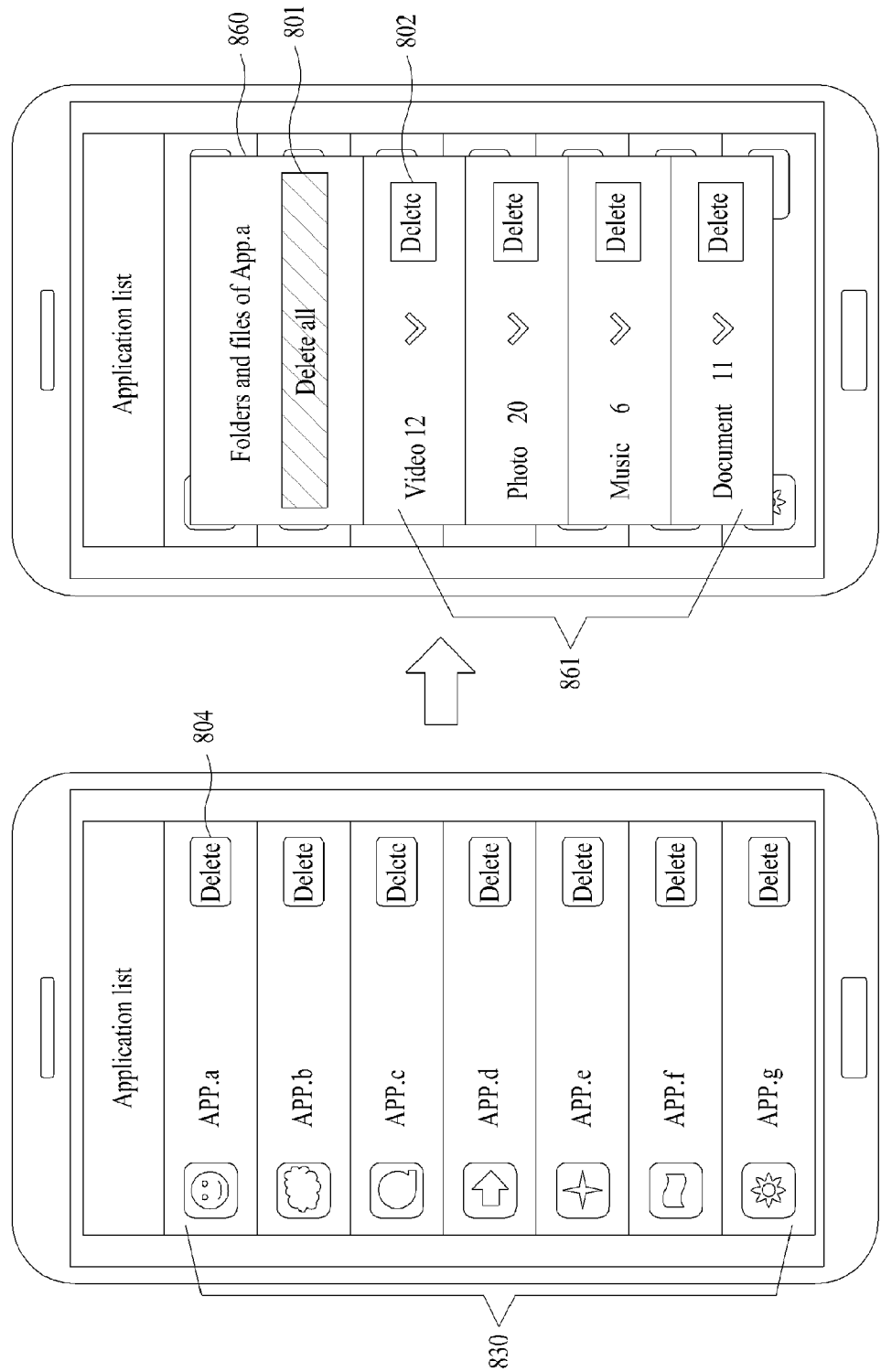

FIGS. 7 and 8 illustrate another example of a system optimization scenario according to some example embodiments.

FIG. 7 illustrates an application list 730 installed in a mobile device. In this example, the application list 730 may include all of system environments that enlist one or more applications. Referring to FIG. 7, the application list 730 may include a 'delete' function 704 capable of selectively deleting an application. In response to selecting the 'delete' function 704, an optimization screen 750 for the application may be displayed. For example, the optimizer 212 may perform an optimization process for deleting all of folders and files of an application selected by a user at the same time of selecting the 'delete' function 704. Accordingly, the optimizer 212 may display the optimization process according to deleting of an arrangement target, for example, all of the folders and files of the application, through the optimization screen 750.

Referring to FIG. 8, in response to selecting a 'delete' function 804 from an application list 830, an optimization service screen 860 for verifying a user intent about optimizing a corresponding application may be provided. In this example, the optimization service screen 860 may provide a function of deleting an application selected by a user. For example, the optimization service screen 860 may include a 'delete all' function 801 capable of deleting all of folders and files of the application at a time and a function 802 of providing a file list 861 in which files stored in a folder of the application are classified for each format and selectively deleting a file of a format selected by the user from the file list 861. In this example, the file list 861 may include a function of verifying files for each format of each item and a function of deleting the verified files. Here, a specific item may include a function of collectively deleting or individually selecting and deleting files of a format.

Figure 9:
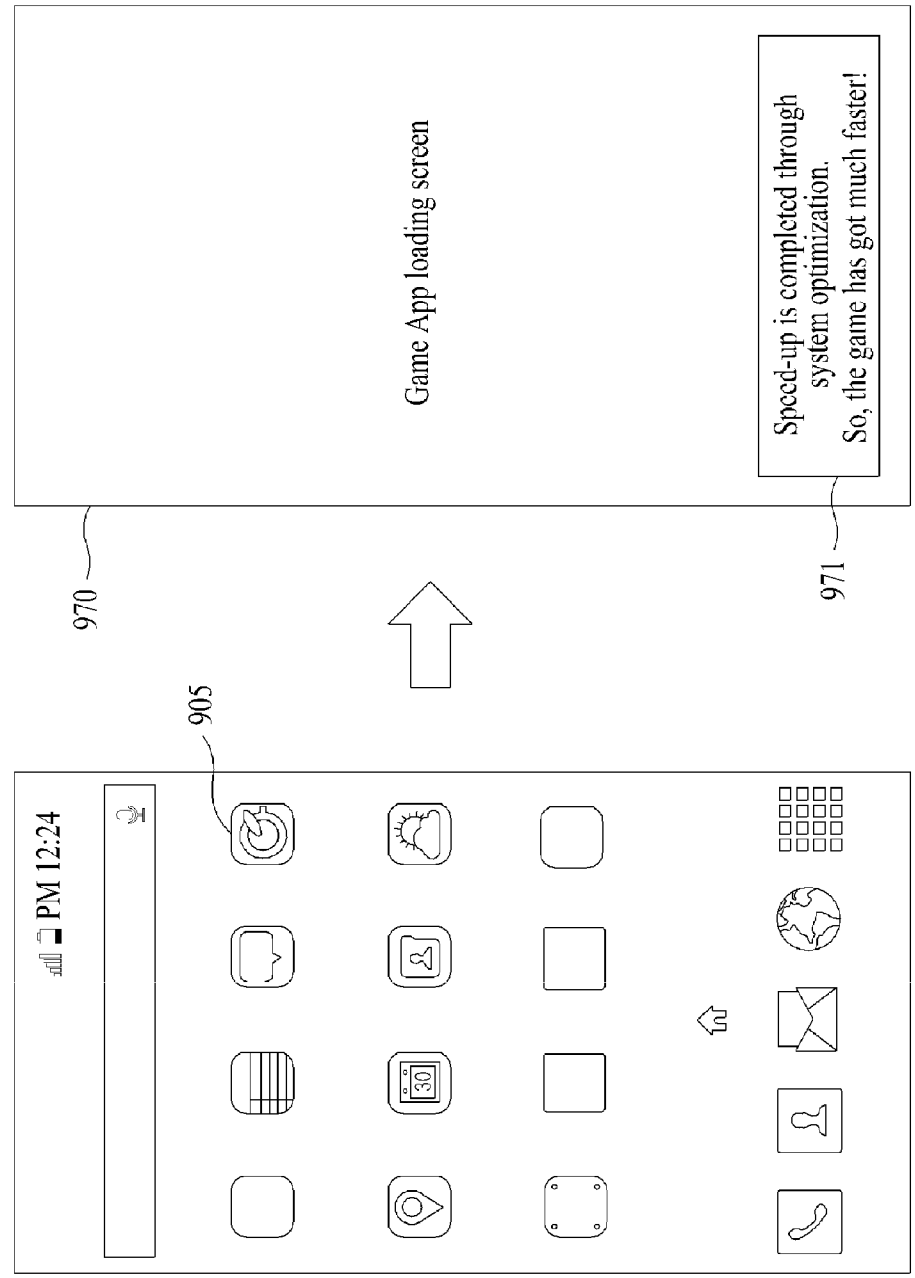
FIGS. 9 and 10 illustrate still another example of a system improvement, enhancement, or optimization scenario according to at least one example embodiment.
Figure 10:
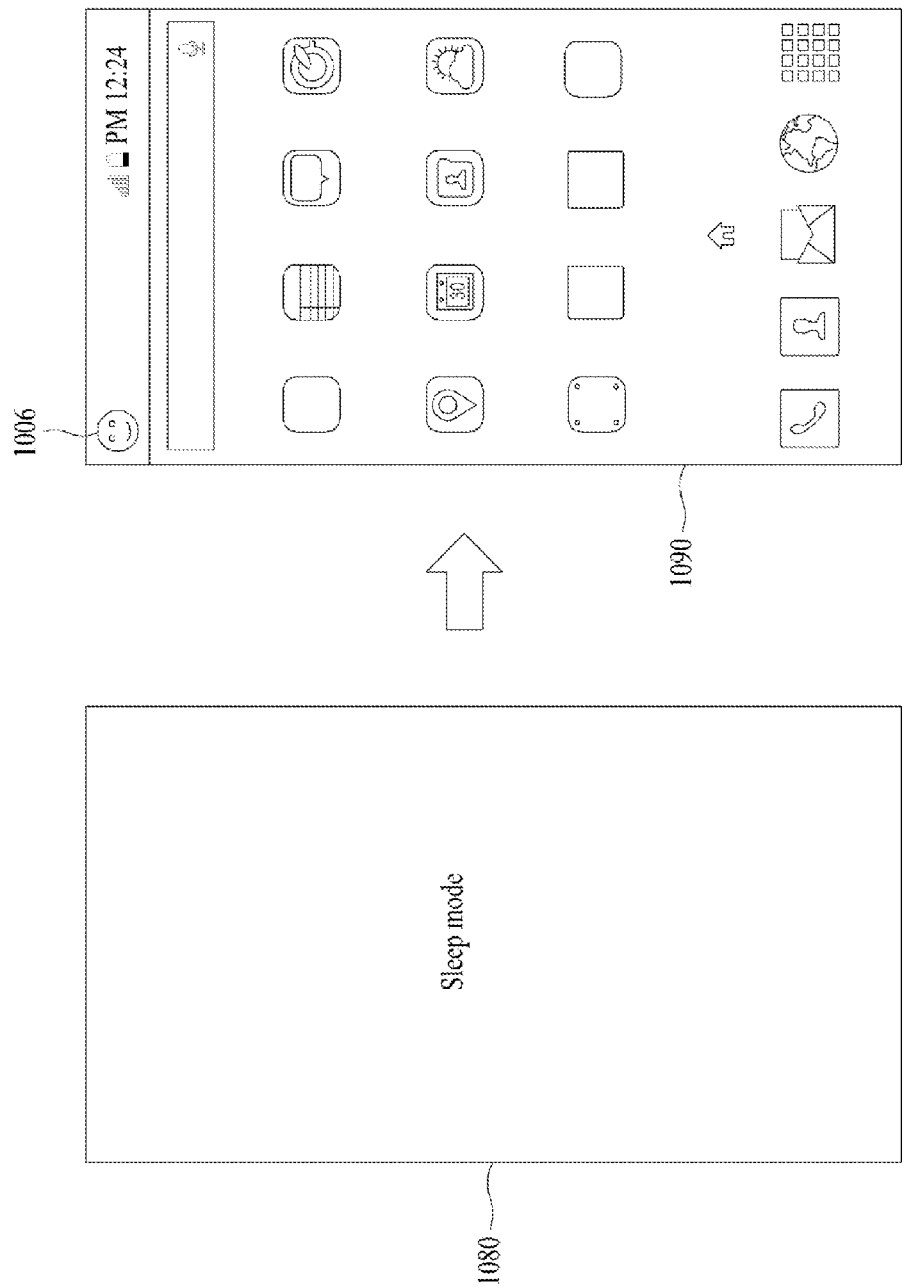

FIGS. 9 and 10 illustrate still another example of a system optimization scenario according to some example embodiments.

Referring to FIG. 9, when an application 905 to be executed by a user is a specific App, for example, a game App, an optimization App may automatically perform system optimization during loading the game App and may display a message 971 associated with the optimization on a loading screen 970 of the game App. In this example, the optimization App may optimize a storage space of a mobile device when executing a specific App determined among Apps or a specific App set by the user.

Referring to FIG. 10, the optimization App may automatically perform system optimization when the mobile device is switched to a sleep mode 1080, and may display a notification about an optimization state when the mobile device is switched from the sleep mode 1080 to a wakeup mode 1090. That is, when the user turns OFF and then turns ON a screen of the mobile device in an example in which a system speed is slow due to execution of a plurality of Apps, a memory and background Apps may be cleaned through an automatic optimization and the system speed may increase. In this example, when the mobile device is switched from the sleep mode 1080 to the wakeup mode 1090, the screen of the mobile device may be turned ON and an icon 1006 indicating that an optimization process is in progress or completed based on whether the optimization is completed may be displayed on a taskbar during a desired (or alternatively predetermined) time, for example, 10 seconds.

Service screens described with reference to FIGS. 4 and 5, and FIGS. 7 through 10 are provided to help the understanding of the present disclosure and for clarity of description and configurations or orders of the service screens may be modified if necessary.

Figure 11:
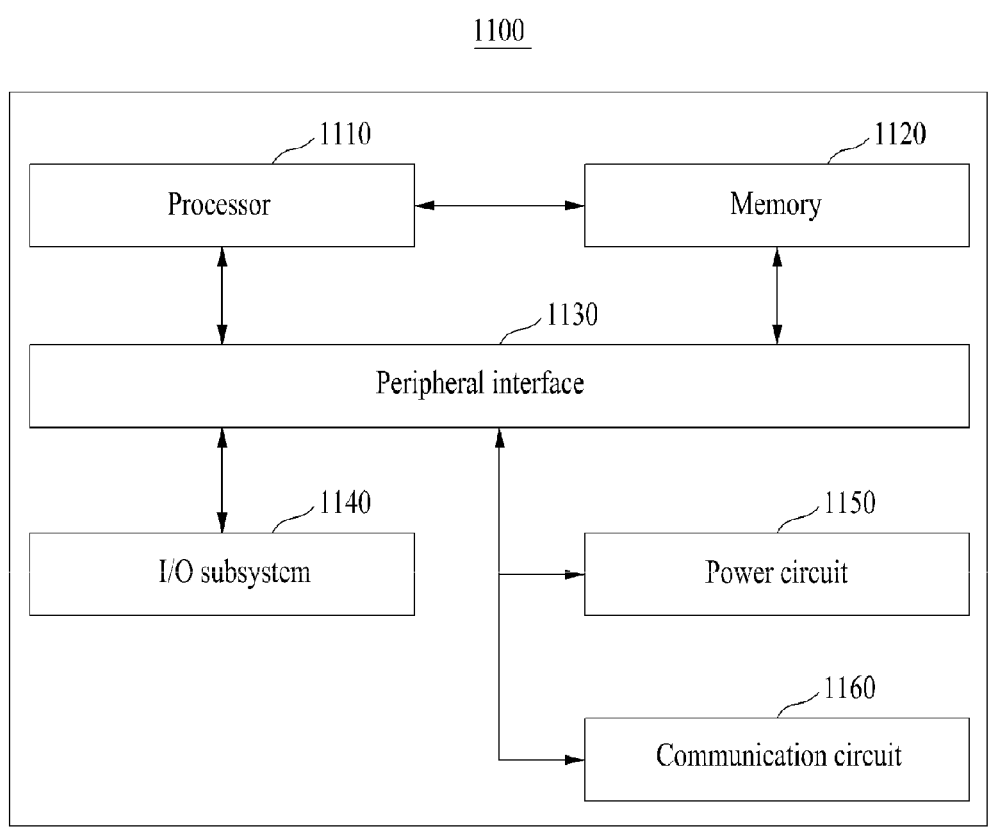
FIG. 11 is a block diagram illustrating a configuration of a computer system according to at least one example embodiment.

FIG. 11 is a block diagram illustrating an example of a configuration of a computer system 1100 according to some example embodiments. Referring to FIG. 11, the computer system 1100 may include at least one processor 1110, a memory 1120, a peripheral interface 1130, an input/output (I/O) subsystem 1140, a power circuit 1150, and a communication circuit 1160. Here, the computer system 1100 may correspond to a user terminal.

The memory 1120 may include, for example, a high-speed random access memory (HSRAM), a magnetic disk, a static random access memory (SRAM), a dynamic RAM (DRAM), read only memory (ROM), a flash memory, and a non-volatile memory. The memory 1120 may include a software module, an instruction set, or a variety of data required for an operation of the computer system 1100. Here, an access from another component such as the processor 1110 and the peripheral interface 1130 to the memory 1120 may be controlled by the processor 1110.

The peripheral interface 1130 may couple an input device and/or output device of the computer system 1100 with the processor 1110 and the memory 1120. The processor 1110 may perform a variety of functions for the computer system 1100 and process data by executing the software module or the instruction set stored in the memory 1120.

The I/O subsystem 1140 may couple various I/O peripheral devices with the peripheral interface 1130. For example, the I/O subsystem 1140 may include a controller for coupling the peripheral interface 1130 and a peripheral device such as a monitor, a keyboard, a mouse, a printer, and a touch screen or a sensor depending on a necessity. The I/O peripheral devices may be coupled with the peripheral interface 1130 without using the I/O subsystem 1140.

The power circuit 1150 may supply a power to all of or a portion of components of a terminal. For example, the power circuit 1150 may include a power management system, at least one power source such as a battery and alternating circuit (AC), a charge system, a power failure detection circuit, a power converter or inverter, a power status indicator, or other components for creating, managing and distributing power.

The communication circuit 1160 enables communication with another computer system using at least one external port. Alternatively, as described above, the communication circuit 1160 may enable communication with another computer system by including a radio frequency (RF) circuit and thereby transmitting and receiving an RF signal known as an electromagnetic signal.

The example embodiments of FIG. 11 are only an example of the computer system 1100. The computer system 1100 may have a configuration or an arrangement for omitting a portion of the components illustrated in FIG. 11, further including components not illustrated in FIG. 11, or coupling two or more components. For example, a computer system for a communication terminal of a mobile environment may further include a touch screen, a sensor, and the like, in addition to the components of FIG. 11. A circuit for RF communication using a variety of communication methods, for example, wireless fidelity (Wi-Fi), 3rd generation (3G), long term evolution (LTE), Bluetooth, near field communication (NFC), and ZigBee, may be included in the communication circuit 1160. Components includable in the computer system 1100 may be configured as hardware that includes an integrated circuit specified for at least one signal processing or application, software, or a combination of hardware and software.

The methods according to the example embodiments may be configured in a program instruction form executable through various computer systems and thereby recorded in non-transitory computer-readable media.

A program according to the example embodiments may be configured as a PC-based program or an application exclusive for a mobile terminal. The optimization App according to the example embodiments may be configured in an independently operating program form, or may be configured in an in-app form of a desired (or alternatively predetermined) application to be operable on the application.

Also, the methods according to the example embodiments may be performed in such a manner that the optimization App controls the user terminal. The application may be installed in the user terminal through a file provided from a file distribution system. As an example, the file distribution system may include a file transmitter (not shown) to transmit the file in response to a request from the user terminal.

As described above, according to some example embodiments, it is possible to optimize a mobile device by classifying applications based on an execution pattern, and to optimize a state of the mobile device by occluding unnecessary applications aside from applications being actually used by a user. Also, according to some example embodiments, it is possible to optimize a mobile device by analyzing a storage pattern of an application, and to remove all of constituent elements associated with the application. Accordingly, it is possible to fully recover an entire memory space. Also, according to some example embodiments, since an arrangement target for optimization is classified for each format and informed to a user, the user may easily verify the arrangement target and thus, may prevent a file damage from occurring due to a unilateral deletion.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device(s) may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. An optimization method configured as a computer comprising a processor, the method comprising:
   identifying, by the processor, an arrangement target for optimization based on analyzing an execution pattern or a storage pattern of each application installed in a mobile device, wherein
   identifying the arrangement target by analyzing the execution pattern includes classifying the applications, based on the execution pattern, into a first application executed by a user and a second application executed by a system without being executed by the user and then identifying the second application as the arrangement target, and
   identifying the arrangement target by analyzing the storage pattern includes identifying, as the arrangement target, a folder and a file stored in the storage space during installing and using each application based on analyzing a pattern of each application that is stored in the storage space; and optimizing, by the processor, a storage space embedded in the mobile device based on the arrangement target;

identifying the arrangement target for optimization based on analyzing the execution pattern, wherein the optimizing includes optimizing the storage space by terminating or deleting the second application.

2. The method of claim 1, wherein the identifying includes additionally identifying, as the arrangement target, at least one of, an application having no execution history during at least a desired period, a file having at least a desired size, content having no use history during at least a desired period, and content having at least a desired storage period.

3. The method of claim 1, wherein the identifying includes excluding an application registered to a white list among the applications from the arrangement target.

4. The method of claim 1, wherein the optimizing includes optimizing the storage space based on deleting the folder and the file identified as the arrangement target with respect to an application, in response to deleting the application.

5. The method of claim 1, wherein the optimizing includes classifying files identified as the arrangement target for each format and thereby providing the classified files to a user, and deleting all of or a portion of the files in response to a selection of the user.

6. The method of claim 1, wherein the optimizing includes additionally optimizing the storage space during loading a desired application in response to a request for executing the desired application among the applications.

7. The method of claim 1, wherein the optimizing includes additionally optimizing the storage space in a sleep mode in response to the mobile device being switched to the sleep mode.

8. A non-transitory computer-readable medium .including computer-readable instructions, wherein when executed by a processor, the computer-readable instructions are configured to control a computer system by a method comprising:

identifying an arrangement target for optimization based on analyzing an execution pattern or a storage pattern of each application installed in a mobile device; wherein identifying the arrangement target by analyzing the execution pattern includes classifying the applications, based on the execution pattern, into a first application executed by a user and a second application executed by a system without being executed by the user and then identifying the second application as the arrangement target, and identifying the arrangement target by analyzing the storage pattern includes identifying, as the arrangement target, a folder and a file stored in the storage space during installing and using each application by analyzing a pattern of each application that is stored in the storage space; and optimizing a storage space embedded in the mobile device based on the arrangement target;

identifying the arrangement target for optimization based on analyzing the execution pattern, wherein the optimizing includes optimizing the storage space by terminating or deleting the second application.

9. An optimization system comprising:

a processor; and a memory storing computer-readable instructions, wherein the processor is configured to execute the computer-readable instructions to, identify an arrangement target for optimization by analyzing an execution pattern or a storage pattern of each of applications installed in a mobile device, wherein identifying the arrangement target by analyzing the execution pattern includes classifying the applications, based on the execution pattern, into a first application executed by a user and a second application executed by a system without being executed by the user and then identifying the second application as the arrangement target, and identifying the arrangement target by analyzing the storage pattern includes identifying, as the arrangement target, a folder and a file stored in the storage space during installing and using each application by analyzing a pattern of each application that is stored in the stored space; and optimize a storage space embedded in the mobile device based on the arrangement target.

identifying the arrangement target for optimization based on analyzing the execution pattern, wherein the optimizing includes optimizing the storage space by terminating or deleting the second application.

10. The optimization system of claim 9, wherein the processor is configured to additionally identify, as the arrangement target, at least one of an application having no execution history during at least a desired period, a file having at least a desired size, content having no use history during at least a desired period, and content having at least a desired storage period.

11. The optimization system of claim 9, wherein the processor is configured to exclude an application registered to a white list among the applications from the arrangement target.

12. The optimization system of claim 9, wherein the processor is configured to optimize the storage space by deleting the folder and the file identified as the arrangement target with respect to an application, in response to deleting the application.

13. The optimization system of claim 9, wherein the processor is configured to classify files identified as the arrangement target for each format and thereby provide the classified files to a user, and to delete all of or a portion of the files in response to a selection of the user.

14. The optimization system of claim 9, wherein the processor is configured to additionally optimize the storage space during loading a desired application in response to a request for executing the desired application among the applications.

15. The optimization system of claim 9, wherein the processor is configured to additionally optimize the storage space in a sleep mode in response to the mobile device being switched to the sleep mode.

* * * * *